July 28, 1970 YUKIHIKO ISE 3,522,382

SWITCHING DEVICE EMPLOYING A PIEZOELECTRIC CERAMIC RESONATOR

Filed April 8, 1968 4 Sheets-Sheet 1

INVENTOR
YUKIHIKO ISE

BY Wenderoth, Lind & Ponack
ATTORNEYS

July 28, 1970 YUKIHIKO ISE 3,522,382

SWITCHING DEVICE EMPLOYING A PIEZOELECTRIC CERAMIC RESONATOR

Filed April 8, 1968 4 Sheets-Sheet 2

INVENTOR
YUKIHIKO ISE

BY Wenderoth, Lind & Ponack
ATTORNEYS

July 28, 1970 YUKIHIKO ISE 3,522,382

SWITCHING DEVICE EMPLOYING A PIEZOELECTRIC CERAMIC RESONATOR

Filed April 8, 1968 4 Sheets-Sheet 3

INVENTOR
YUKIHIKO ISE

BY Wenderoth, Lind & Ponack
ATTORNEYS

INVENTOR
YUKIHIKO ISE

BY Wenderoth, Lind & Ponack
ATTORNEY

United States Patent Office 3,522,382

Patented July 28, 1970

3,522,382

SWITCHING DEVICE EMPLOYING A PIEZO-ELECTRIC CERAMIC RESONATOR

Yukihiko Ise, Osaka, Japan, assignor to Matsushita Electric Industrial Co., Ltd., Osaka, Japan Filed Apr. 8, 1968, Ser. No. 719,364

Claims priority, application Japan, Apr. 18, 1967, 42/25,645; Apr. 19, 1967, 42/25,550

Int. Cl. H04r *5/04*

U.S. Cl. 179—15 4 Claims

ABSTRACT OF THE DISCLOSURE

A switching device which has a switching circuit and a piezoelectric ceramic resonator. The resonator comprises a rectangular thin plate and has its fundamental resonance frequency at a longitudinal extensional vibration mode. Said resonator is provided with pairs of electrodes applied to both large surfaces thereof along the longitudinal axis. Said pairs of electrodes are combined with pairs of terminals respectively and are divided into three groups; input terminals, output terminals, and ground terminals. One of said input terminals is supplied with a subcarrier signal capable of vibrating said resonator. The other input terminals are supplied with a composite signal which includes a mixture of two distinct signals for subcarrier suppression. One of said output terminals transmits a first signal including a large amplitude signal from the subcarrier and the other output terminal transmits a second signal which is demodulated and is opposite in phase from said first signal. The switching circuit has two input terminals coupled to the resonator output terminals for receiving said first and said second signals, respectively and two output terminals. One of said two output terminals transmits a single distinct demodulated signal from said first signal and the other, a single distinct demodulated signal from said second signal.

BACKGROUND OF THE INVENTION

Field of the invention

This invention relates to a switching device comprising a piezoelectric ceramic resonator and a switching circuit coupled with said resonator, said switching device being capable of demodulating a composite signal including a mixture of two distinct signals and separately transmitting each of the distinct signals.

Description of the prior art

In a conventional switching device for demodulating an amplitude modulated signal, the carrier suppression system consists of a switching transformer having coils and capacitors. However, the coils known in the prior art have usually had inferior tolerances and inferior temperature and aging characteristics.

Therefore, precise adjustment of the coils has been necessary for reproducing the modulated signal with high fidelity.

A piezoelectric ceramic resonator has been widely used for an electric wave filter or a frequency selective transformer, but it has not been used as a switching device, especially as a switching device for an FM stereo multiplex circuit. This is because the performance of the conventional piezoelectric ceramic resonator has not been sufficient to satisfy the conditions necessary for a switching device.

It is important that such a switching device be capable of superior channel separation. Superior channel separation can be achieved by employing a piezoelectric ceramic resonator capable of distinguishing and selecting polarity and eliminating unwanted responses.

SUMMARY OF THE INVENTION

An object of the present invention is to provide a switching device for use in a suppressed carrier multiple transmission system for electrical communication which is characterized by superior channel separation.

A further object of the present invention is to provide a switching device for channel separation which is characterized by high stability with respect to temperature and time.

A further object of the present invention is to provide a switching device characterized by its small size and ease of construction.

A further object of the present invention is to provide a switching device characterized by its superior ability to separate FM stereophonic composite signals.

The present invention achieves these objects by providing a switching device comprising a switching circuit and a piezoelectric ceramic resonator comprising a rectangular thin plate and having its fundamental frequency at a longitudinal extensional vibration mode.

Said resonator is provided with pairs of electrodes applied to both large surfaces thereof along the longitudinal axis. Said pairs of electrodes are combined with pairs of terminals, respectively, and are divided into three groups; input terminals, output terminals, and ground terminals. One of said input terminals is supplied with a subcarrier signal capable of vibrating said resonator. The other input terminals are supplied with a composite signal which includes a mixture of two distinct signals for subcarrier suppression. One of said output terminals transmits a first signal including a large amplitude signal from the subcarrier and the other output terminal transmits a second signal which is demodulated and is opposite in phase from said first signal as explained hereinafter. Said switching circuit has two input terminals coupled to the resonator outputs for receiving said first and said second signals, respectively, and two output terminals. One of said two output terminals transmits a single distinct demodulated signal from said first signal and the other, a single distinct demodulated signal from said second signal.

Other objects of the present invention will become apparent from the following detailed description taken together with the accompanying drawings wherein:

DESCRIPTION OF A PREFERRED EMBODIMENT

Before proceeding with the detailed description of the novel switching device of the present invention, a demoduation mechanism for a suppressed carrier, multiple transmission signal, such as the stereophonic audio signal of an FM stereo broadcasting system, will be explained with reference to FIG. 1.

Figure 1:
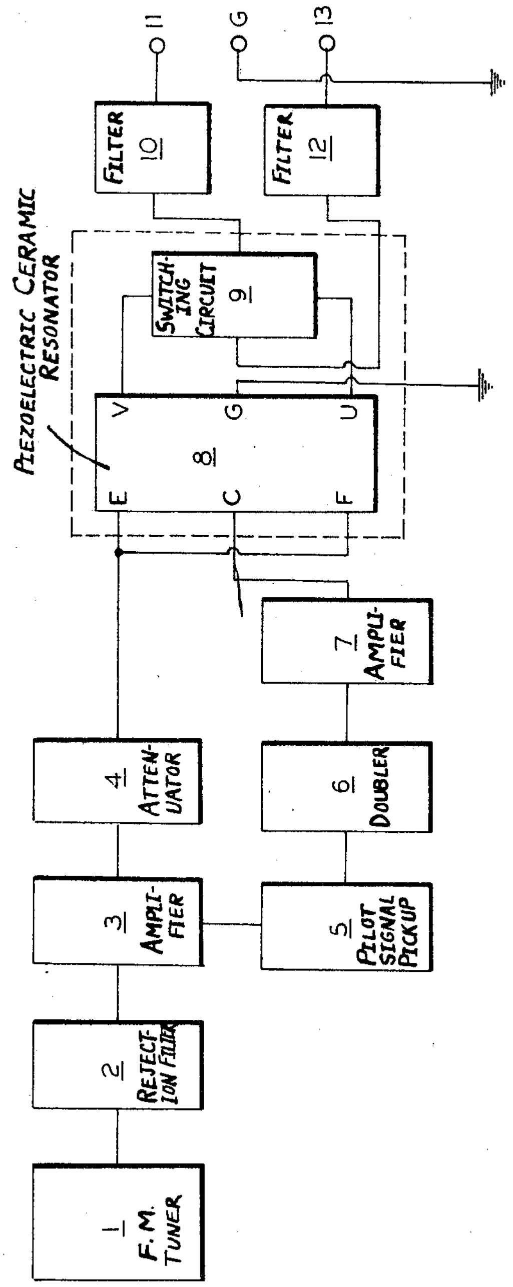
FIG. 1 is a block diagram of an FM stereo multiplex circuit using the switching device of the present invention.

Referring to FIG. 1, an FM tuner 1 derives a desired stereophonic composite signal including a mixture of two distinct signals in accordance with the following Equation 1:

$$A=(L+R)+(L-R)\cos \omega t+p\cos \frac{\omega t}{2}+S \qquad (1)$$

in which, A is the amplitude of the stereophonic signal, L is the amplitude of the single distinct signal from the left channel, R is the amplitude of the single distinct signal from the right channel, $\omega$ is the angular frequency of the subcarrier and is equal to $2\pi fs$ where $fs$ is the frequency of the subcarrier, and $p$ is the amplitude of the pilot signal. S is the amplitude of the subsidiary communication authorization (abbreviated to SCA) channel signal, $(L+R)$ represents the main channel signal and $(L-R)\cos \omega t$ represents the subchannel signal. In the modulated signal for FM stereo broadcasting, the subchannel signal is changed to a suppressed double side band carrier signal.

The desired sterephonic composite signal is modified by a rejection filter 2 so that the SCA signal S is removed, and the composite signal then enters an amplifier 3 having two outputs, one of which is connected to an attenuator 4 which in turn is connected to a first and second input terminal E and F of a piezoelectric ceramic resonator 8 having a ground terminal G, and the other of which is connected to a pilot signal pickup 5 for picking up the pilot signal $$p\cos \frac{\omega t}{2}$$

Said pilot signal is converted into a subcarrier signal by a doubler 6. An amplifier 7 connected to said doubler 6 amplifies said subcarrier signal. The amplified subcarrier signal enters an input terminal C of said piezoelectric ceramic resonator 8. The resonator 8 has a resonant frequency equal to the frequency of said subcarrier signal. Said piezoelectric ceramic resonator 8 is vibrated by said subcarrier signal in a resonance vibration mode.

It is important that said piezoelectric ceramic resonator be a thin rectangular plate and have its resonance frequency for the fundamental longitudinal extensional vibration mode at the frequency of said subcarrier signal.

An output terminal U of said resonator 8 receives and transmits a first signal derived by the resonator from the inputs thereto and including a large amplitude signal from the subcarrier, which first signal is capable of actuating a switching circuit 9. An output terminal V receives and transmits a second signal derived by the resonator from the inputs thereto and which includes a large amplitude signal from the subcarrier, which second signal actuates a switching circuit 9 but which has an opposite phase from said first signal. Said first signal is approximately expressed by the Equation 2:

$$A_1=(L+R)+(L-R)\cos \omega t+Vc\cos \omega t \qquad (2)$$

$$Vc, \text{ L, and R} \qquad (3)$$

in which $A_1$ is the amplitude of said first signal and $Vc$ is the amplitude of the subcarrier signal derived by said piezoelectric ceramic resonator 8. Said second signal is approximately expressed by the Equation 4:

$$A_2=(L+R)+(L-R)\cos \omega t-Vc\cos \omega t \qquad (4)$$

$$Vc \text{ L, and R}$$

in which, $A_2$ is the amplitude of said second signal. Said first signal is modified into a single distinct signal, $A_1'\alpha 2L$ by a switching circuit 9 and is fed to an output terminal 11 through a filter 10 which removes unwanted signals. Said second signal is modified into a single distinct signal, $A_2'\alpha 2R$ by said switching circuit 9 and is fed to an output terminal 13 through a filter 12 which removes unwanted signals.

Figure 2:
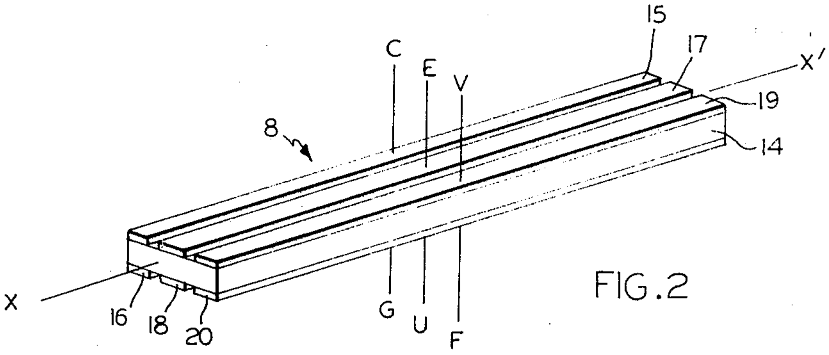
FIG. 2 is a perspective view of a six terminal piezoelectric ceramic resonator having a longitudinal extensional vibration mode according to the present invention.

Referring to FIG. 2, the piezoelectric ceramic resonator 8 comprises a piezoelectric ceramic body 14 in the form of a rectangular thin plate. Three pairs of opposed electrodes 15 and 16, 17 and 18, and 19 and 20 are applied to the large faces of said ceramic body 14 parallel with the longitudinal axis. Said three pairs of electrodes 15 and 16, 17 and 18, and 19 and 20 are arranged substantially symmetrically with respect to the longitudinal center axis X, X' of said body 14 and have attached thereto terminals C and G, E and U and V and F, respectively. The piezoelectric ceramic body 14 is polarized in the direction of its thickness. When an electrical input voltage is supplied between any of the terminals, for example between terminals C and G of the resonator 8, each of the other two pairs of terminals E and U and F and V receives an electrical signal derived by the resonator. The electric signal from each of said two pairs of terminals E–U and F–V becomes maximum at the resonant frequency of the longitudinal extensional vibration mode, as shown in FIG. 3.

Figure 3:
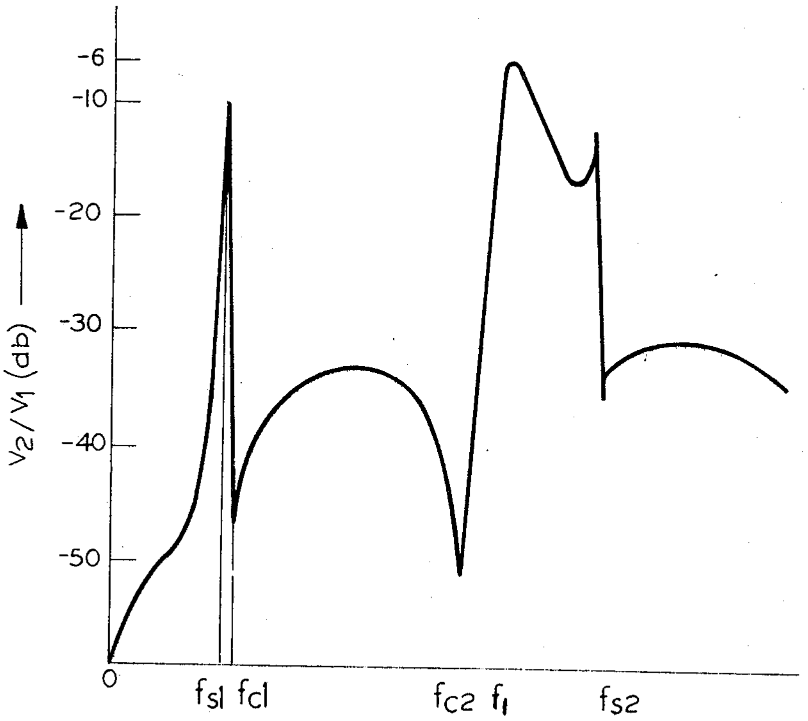
FIG. 3 is a graph of the transmission characteristics of the resonator shown in FIG. 2.

Referring to FIG. 3, $V_1$ is an input voltage supplied between said input terminal C and the ground terminal G, and $V_2$ is an output voltage measured between a pair of terminals E and U or between terminals F and V. The vertical axis of FIG. 3 is for the ratio $V_2/V_1$ in db and the horizontal axis is the frequency. Said piezoelectric resonator 8 has five characteristic frequencies $fs_1$, $fc_1$, $fc_2$, $f_1$ and $fs_2$, as shown in FIG. 3. The frequency $f_1$ is the resonant frequency of the longitudinal extensional vibration mode and is the operating frequency of said resonator 8.

The remaining four characteristic frequencies are unwanted response frequencies in said resonator 8. The frequencies $fs_1$ and $fs_2$ are the frequencies of the fundamental and the first over-tone, respectively, at resonance for a face flexural vibration mode. The frequencies $fc_1$ and $fc_2$ are the frequencies at a pole of attenuation due to electrostatic coupling between one of the input terminals and one of the output terminals, for example, terminals C and E.

Figure 4:
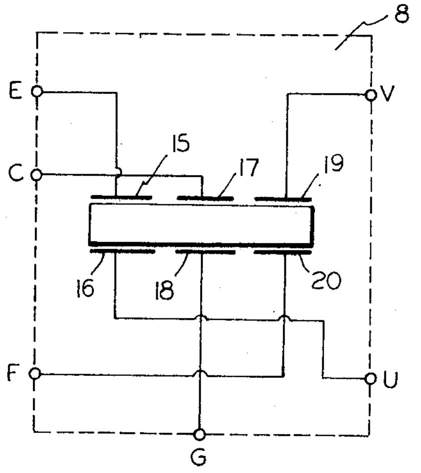
FIG. 4 is a diagram showing the electrical connections between the terminals of the resonator shown in FIG. 2.

Referring to FIG. 4 wherein similar numbers designate elements similar to those of FIG. 2, a piezoelectric ceramic resonator 8 has three pairs of terminals E–U, C–G, and V–F, attached to three pairs of electrodes 15–16, 17–18, and 19–20, respectively. The center pair of terminals C–G act as an input terminal for a subcarrier signal and a ground terminal, respectively. One of the remaining two pairs of terminals, for example E–U, act as a first input terminal for a composite signal and a first output terminal, respectively. The last pair of terminals F–V act as a second input terminal for a composite signal and a second output terminal, respectively. It is important that said first input terminal be so positioned as not to be opposite said second input terminal.

An operable circuit arrangement for said switching circuit 9 is a bridge circuit comprising four branches, each of said branches consisting of a diode and a resistor connected in series. It is possible to employ any switching circuit capable of modifying the aforesaid first and second signals into single distinct signals.

Figure 5:
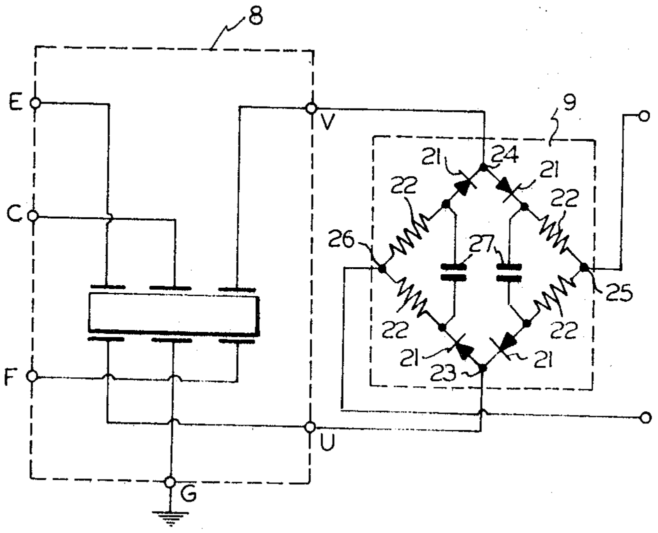
FIG. 5 is a diagram showing the connections between the terminals of the switching device according to the present invention.

It has been discovered according to the present invention that the novel piezoelectric ceramic resonator according to the invention achieves an optimum performance as a switching device when combined with a switching bridge circuit, as shown in FIG. 5. Referring to FIG. 5 wherein similar reference numbers designate components similar to those in the forgoing drawings, the switching bridge circuit 9 comprises four branches, each of which consists of a diode 21 and a resistor 22 connected in series. Junction points 23 and 24 at opposite sides of the circuit act as input terminals and the remaining junction points 25 and 26 act as output terminals. Two capacitors 27 are connected to the junction points between said diodes 21 and said resistors 22 in parallel with the resistors in the two circuits between the two input terminals 23 and 24.

Said switching bridge circuit is combined with the novel piezoelectric ceramic resonator 8 having first and second input terminals E and F, an input terminal C, first and second output terminals U and V, and a ground terminal G with said input terminal 23 of the switching bridge circuit connected to said output terminal U and said input terminal 24 connected to said second output terminal V.

In the switching bridge circuit, resistors 22 and/or capacitors 27 can be removed for simplicity.

In the forgoing description, the piezoelectric ceramic resonator has been provided with six terminals. However, a piezoelectric ceramic resonator having ten terminals achieves a better performance with respect to the frequency characteristics when combined with any available switching circuit, preferably with said switching bridge circuit of FIG. 5, in accordance with the present invention.

Figure 6:
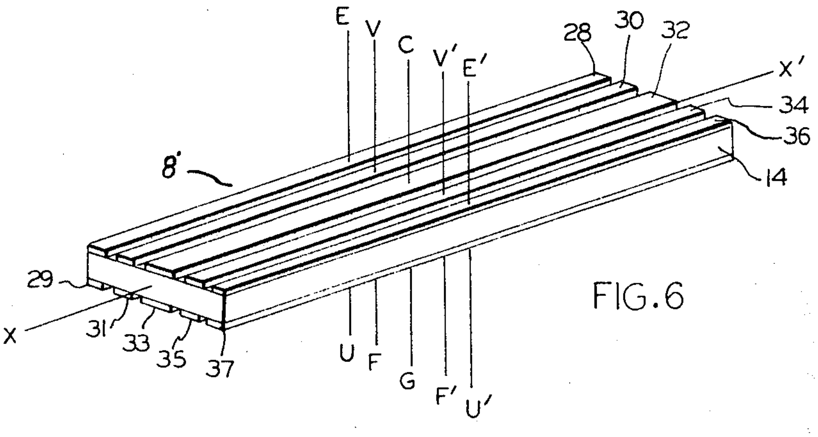
FIG. 6 is a perspective view showing a ten terminal resonator according to the present invention.

Referring to FIG. 6, reference character 8′ designates, as a whole, a piezoelectric ceramic resonator comprising a piezoelectric ceramic body 14 in the form of a rectangular thin plate. Five pairs of electrodes 28–29, 30–31, 32–33, 34–35 and 36–37, are applied to the large surfaces of said ceramic body 14 in parallel with the longitudinal axis thereof and are arranged substantially symmetrically to the longitudinal center axis X–X′. Terminal leads E–U, V–F, C–G, V′–F′ and E′–U′ are attached to said five pairs of electrodes 28–29, 30–31, 32–33, 34–35 and 36–37, respectively. Said ceramic body 14 is polarized in the direction of its thickness.

Figure 7:
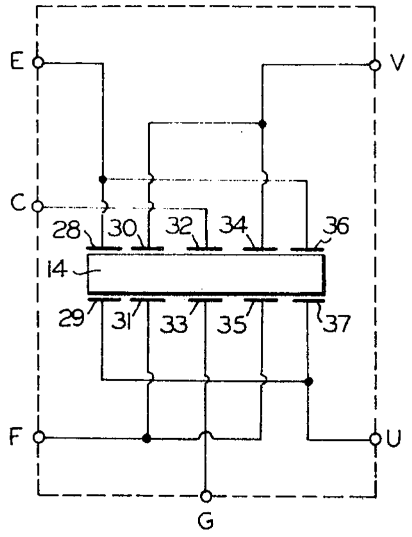
FIG. 7 is a diagram showing the terminal connections of the resonator shown in FIG. 5.

Referring to FIG. 7 wherein similar reference characters designate components similar to those of FIG. 6, a center pair of terminals C–G attached to a pair of electrodes 32–33 act as an input terminal and a ground terminal for the aforesaid subcarrier signal, respectively. The terminal leads for electrodes 28 and 36, positioned at the outer edges of one surface of said ceramic body 14, are connected together and act as a first input terminal E for the aforesaid composite signal. The terminal leads for the electrodes 30 and 34 positioned on opposite sides of and adjacent to said center terminal 32 are connected together and act as a second output terminal V. The terminal leads for the electrodes 29 and 37 positioned at the outer edges of the other surface of said ceramic body 14 are connected together and act as a first output terminal U. The terminal leads for electrodes 31 and 35 positioned on opposite sides of and adjacent to said center terminal 33 are connected together and act as a second input terminal F for the aforesaid composite signal. It is important that the input electrodes 28 and 36 on one surface do not face the input terminals 31 and 35 of the other surface.

Figure 8:
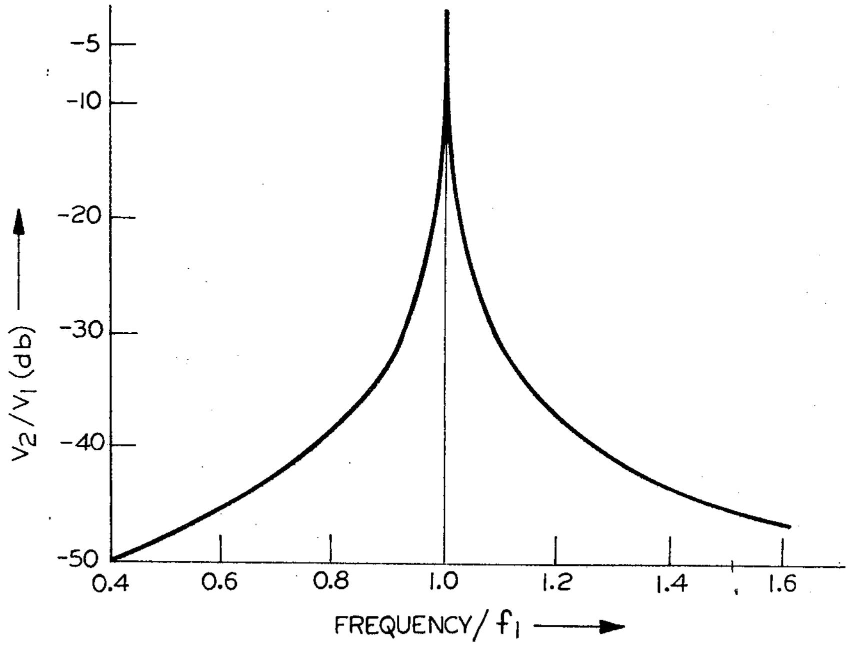
FIG. 8 is a graph showing the transmission characteristics of the resonator shown in FIG. 6.

Such a resonator, having five pairs of terminals, has a superior frequency characteristic, as shown in FIG. 8 wherein $f_1$ is the fundamental resonant frequency of the longitudinal extensional vibration mode. It will be clear that the resonator having five pairs of terminals does not produce unwanted resonance frequencies of the face flexural vibration mode.

The resonator of FIG. 6 is connected with a switching circuit in a way similar to that shown in FIGS. 1 and 5 and constitutes an excellent switching device in accordance with the present invention.

A piezoelectric ceramic resonator according to the present invention is made by employing a piezoelectric ceramic material, for example, the piezoelectric ceramic material described in the U.S. Pat. No. 3,268,453 in the form of a thin rectangular plate having the dimension of 47.7 x 6.0 x 0.7 mm. Said piezoelectric ceramic material has the piezoelectric characteristic as listed in Table 1.

TABLE 1

Frequency constant—1800 kHz.-mm.
Frequency stability with time—0.05%/decade

Temperature—$37 \times 10^{-6}$/°C.
Dielectric constant—1350
Capacitance ratio—25
Mechanical Q—500

In a specific embodiment of the invention, such a piezoelectric ceramic resonator has three pairs of terminals attached to three pairs of electrodes (FIG. 2) and is combined with a switching bridge circuit (FIG. 5) having the following components:

Diodes 21—OA79
Resistors 22—47KΩ
Capacitors 27—1000 pf.

The switching device comprising said resonator and said switching bridge circuit has a channel separation performance of more than 20 db in a frequency range of from 100 Hz. to 10 kHz. Said channel separation performance is characterized by a high stability with respect to temperature, time and humidiy as indicated by Table 2.

TABLE 2

Variation in channel separation

| | |
|---|---|
| Time | 0.1%/decade |
| Temperature | 0.03%/° C. |
| Humidity | 0.1% at 90% RH, 40° C. for 500 hr. |

In ths foregoing, the disclosed embodiments and specific example of the present invention are set forth as examples of the many modifications which are possible. It is to be understood that the invention provides a switching device for use in the demodulation of modified suppressed carrier signals in an electrical communication system.

What we claim is:

1. A switching device comprising a piezoelectric ceramic resonator having three input terminals, two output terminals and a grounded terminal, one of the input terminals being a subcarrier signal receiving terminal, the other two input terminals being a composite signal receiving terminals for receiving a mixture of two distinct signals, one of said output terminals being a first electrical signal output terminal for a signal derived by said resonator, the other of said output terminals being a second electrical output terminal for a signal derived by said resonator and which is modified and opposite in phase from said first signal, and a switching circuit including two input terminals coupled to the respective output terminals of the piezoelectric ceramic resonator and which receive said first and second signals, respectively, and two output terminals, one of which is a terminal for a single distinct demodulated signal from said first signal and the other of which is a terminal for a single distinct demodulated signal from said second signal; and piezoelectric ceramic resonator comprising a thin rectangular plate and having its resonance frequency for the fundamental longitudinal extensional vibration mode at the frequency of said subcarrier signal.

2. A switching device as claimed in claim 1, wherein said piezoelectric ceramic resonator has three pairs of electrodes which are applied to the opposite large surfaces of the thin rectangular plate parallel with the longitudinal axis, terminals connected to said electrodes, the terminals of the center pair of said three pairs of electrodes being the ground terminal and the input terminal for said subcarrier signal, respectively; the terminals of one pair of the remaining two pairs of electrodes acting as the first input terminal for a composite signal and one output terminal, respectively, and the last pair of said terminals being the second input terminal for a composite signal and the second output terminal, respectively, said first input terminal being opposed to a terminal other than said second input terminal.

3. A switching device as claimed in claim 1, wherein said piezoelectric ceramic resonator has five pairs of electrodes which are applied to the opposing large surfaces of said ceramic body in parallel with the longitudinal axis thereof; terminals connected to said electrodes, the terminals of the center pair of said five pairs of electrodes being the ground terminal and the input terminal for said subcarrier signal, respectively; the terminals for the two electrodes positioned at the outer edges of one surface being connected together and being the first input terminal for said composite signal and the terminals of the two electrodes positioned on opposite sides of and adjacent to said center terminal being connected together and being the second output terminal; the terminals of the two electrodes positioned at the outer edges of the other surface being connected together and being the first output terminal and the terminals of the two electrodes positioned on opposite sides of and adjacent to said center terminal being connected together and being the second input terminal for said composite signal, whereby the input electrodes on one surface are opposed to electrodes other than the input electrodes on the other surface.

4. A switching device as claimed in claim 1, wherein said switching circuit comprises a bridge circuit having four branches, each of which comprises a diode and a resistor connected in series; two junction points of said four branches acting as input terminals and the other two junction points of said four branches acting as output terminals.

No References Cited

KATHLEEN CLAFFY, Primary Examiner

T. J. D'AMICO, Assistant Examiner

U.S. Cl. X.R.

329—117